United States Patent [19]
Collette et al.

[11] Patent Number: 5,759,653
[45] Date of Patent: Jun. 2, 1998

[54] OXYGEN SCAVENGING COMPOSITION FOR MULTILAYER PREFORM AND CONTAINER

[75] Inventors: Wayne N. Collette; Steven L. Schmidt, both of Merrimack, N.H.

[73] Assignee: Continental PET Technologies, Inc., Florence, Ky.

[21] Appl. No.: 355,703

[22] Filed: Dec. 14, 1994

[51] Int. Cl.$^6$ ................................................ B65B 55/19
[52] U.S. Cl. .................... 428/35.9; 428/35.8; 428/36.7; 428/542.8; 428/483; 428/903.3; 252/188.24; 252/188.28; 215/12.1
[58] Field of Search ................... 428/35.8, 36.7, 428/35.9, 542.8, 903.3, 483; 252/188.28, 186.24; 215/12.1

[56] References Cited

U.S. PATENT DOCUMENTS

| | | | |
|---|---|---|---|
| 4,962,164 | 10/1990 | Jabarin et al. | 525/445 |
| 5,021,515 | 6/1991 | Cochran et al. | 525/371 |
| 5,034,252 | 7/1991 | Nilsson et al. | 428/35.8 |
| 5,049,624 | 9/1991 | Adams et al. | 525/371 |
| 5,077,111 | 12/1991 | Collette | 428/36.7 |
| 5,153,038 | 10/1992 | Koyama et al. | 428/35.8 |
| 5,202,052 | 4/1993 | Zenner et al. | 252/188.2 |
| 5,239,016 | 8/1993 | Cochran et al. | 525/371 |
| 5,281,360 | 1/1994 | Hong et al. | 252/188.2 |
| 5,301,838 | 4/1994 | Schmidt et al. | 222/95 |
| 5,314,987 | 5/1994 | Kim et al. | 528/289 |

FOREIGN PATENT DOCUMENTS

| | | |
|---|---|---|
| 10080/88 | 7/1988 | Australia . |
| 0 369 713A2 | 5/1990 | European Pat. Off. . |
| 0 519 616A1 | 12/1992 | European Pat. Off. . |
| A2149932 | 3/1973 | France . |
| 90/00504 | 1/1990 | WIPO . |

OTHER PUBLICATIONS

"Oxbar: The Oxygen Barrier".
"CMB Pioneers New PET Oxygen Barrier." Plastics & Rubber Weekly, Feb. 10, 1990.
"CMB Develops Barrier PET Material." European Chemical News, 19 Feb. 1990.
"PET Blend Offered As Coex Alternative." Modern Plastics International, Feb. 1990.
Koyama et al., "Oxygen Scavenging Technology For Packaging (Oxyguard)." Popular Plastics & Packaging, Annual 1992.
Brockschmidt, "Coextrusion Developments Focus On Barrier Resins." Plastics Technology, Dec. 1987.
Lambert et al., "The Rate Of Absorption Of Oxygen By Ageless™: The Utility Of An Oxygen Scavenger In Sealed Cases." Studies In Conservation 37, 1992, 267–274.
"Design Guidelines For Plastic Bottle Recycling." Association Of Postconsumer Plastic Recyclers.

*Primary Examiner*—Charles Nold
*Attorney, Agent, or Firm*—Wolf, Greenfield & Sacks, P.C.

[57] ABSTRACT

An oxygen scavenging composition, method of making the same, and multilayer container structures thereof which enable accelerated activation of the oxygen scavenging property and/or barrier layers to prevent depletion of the oxygen scavenging property. In making a container wall, or a precursor thereof such as a preform, a base polymer is used including post-consumer polyethylene terephthalate (PC-PET) and an oxygen scavenger. A resulting multilayer package wall may include an oxygen scavenging core layer and an inner layer of a material having a high oxygen barrier condition prior to product filling, and a second lower oxygen barrier condition after product filling. The inner layer thus allows oxygen entrapped in the container during product filling to be transmitted through the inner layer and absorbed by the core oxygen scavenging layer, in order to increase the product shelf life.

33 Claims, 7 Drawing Sheets

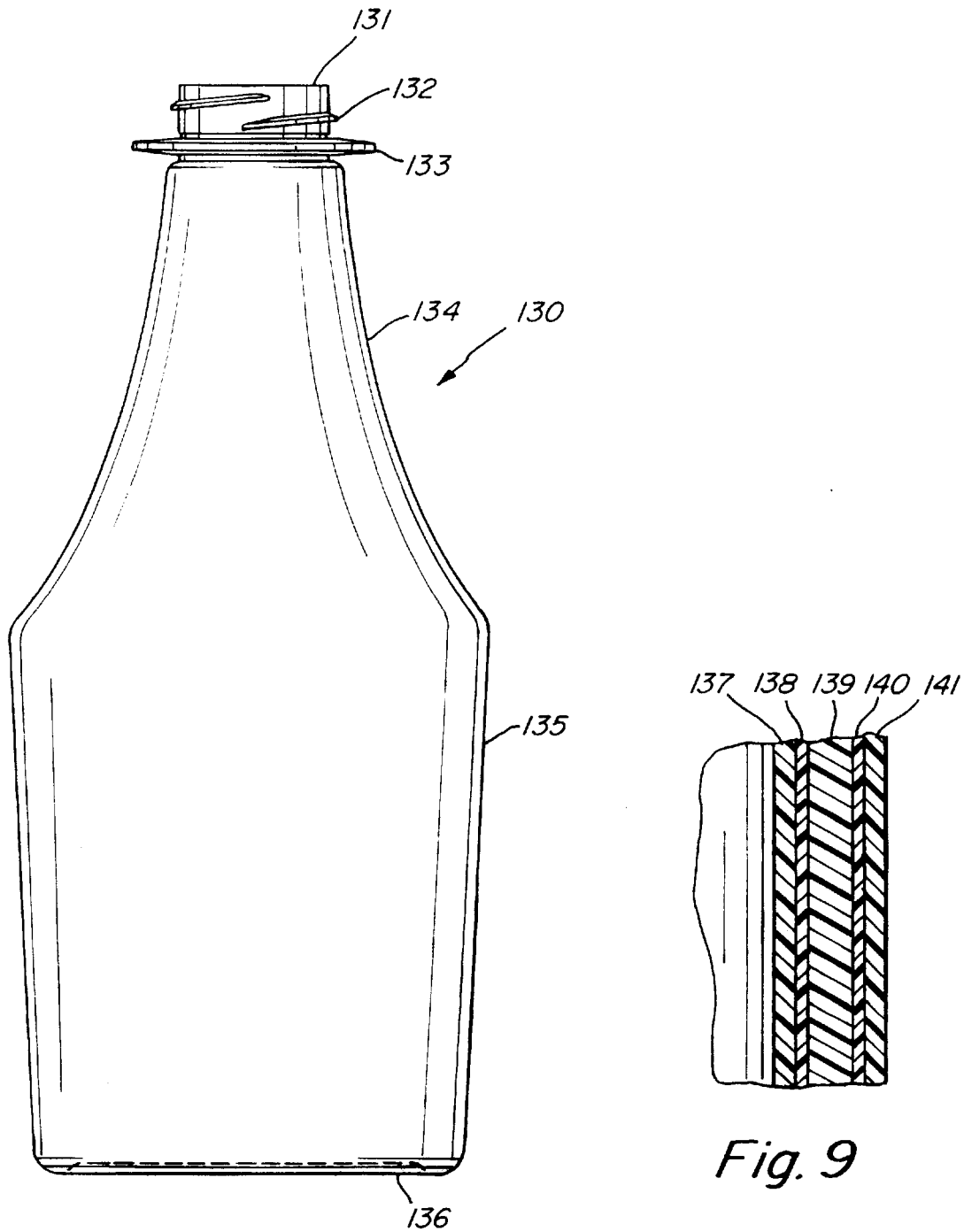

5,759,653

OXYGEN SCAVENGING COMPOSITION FOR MULTILAYER PREFORM AND CONTAINER

FIELD OF THE INVENTION

The present invention relates to an oxygen scavenging composition particularly useful in multilayer preform and container structures, such as blow-molded polyethylene terephthalate (PET) beverage bottles, and more particularly to a composition including post consumer polyethylene terephthalate (PC-PET) to accelerate activation of the oxygen scavenger. In other aspects, the invention includes multilayer structures which accelerate activation of the oxygen scavenger, prevent depletion of the oxygen scavenging effect, and/or prevent migration of the oxygen scavenger and its byproducts into the product.

BACKGROUND OF THE INVENTION

"Oxygen sensitive" materials, including foods, beverages, and pharmaceutical products, have special packaging requirements to prevent the ingress of exterior oxygen into the package and/or to scavenge oxygen which is present inside the package. In some cases, particularly in the orange juice and brewing industries, oxygen is removed from the product by vacuum or by inert gas sparging, or both. However, it is difficult and expensive to remove the last traces of oxygen by these methods; they have an additional disadvantage of tending to remove volatile product components which are often responsible for some or all of the aroma and flavor of the product.

Molecular oxygen ($O_2$) can be reduced to a variety of highly reactive intermediate species by the addition of one to four electrons. The carbon-carbon double bonds found in virtually all foods and beverages are particularly susceptible to reaction with these intermediate species. The resulting oxidation products adversely affect the performance, odor or flavor of the product. An "oxygen scavenger" is any material or compound which can remove oxygen from the interior of a closed package either be reacting or combining with the entrapped oxygen, or by promoting an oxidation reaction which yields innocuous products.

Extensive work has been done on incorporating oxygen scavengers in polymers for production of plastic containers. For example, the OXBAR barrier system for PET packaging utilizes a metal-catalyzed oxidizable organic polymer. The oxygen scavenging polymer may comprise the entire package wall, or may comprise one layer of a multilayer structure. For example, U.S. Pat. No. 5,034,252 to Nilsson et al. suggests a single-layer container wall consisting of a blend of polyethylene terephthalate (PET), 1–7% by weight polyamide (e.g., MXD-6 nylon), and 50–1000 ppm transition metal catalyst (e.g., cobalt). Nilsson theorizes that the cobalt forms an active metal complex having the capacity to bond with oxygen and to coordinate to the groups or atoms of the polymer. However, Nilsson notes that low oxygen permeability coefficients are achieved only after an aging (activation) process, which may require exposure to a combination of temperature and humidity.

U.S. Pat. No. 5,021,515 to Cochran et al. describes a multilayer structure formed by co-extrusion lamination using adhesive tie layers. Cochran describes a three-layer structure including a central layer of metal-catalyzed oxidizable organic polymer, and inner and outer layers of a second polymer to prevent interaction of the central layer (containing cobalt) with the package contents and environment. However, Cochran similarly notes the aging effect (col. 10, lines 60–63).

Another problem recognized by the art, is that when empty bottles are stored in air (i.e., between production and filling) they may loose their oxygen scavenging power. For example, U.S. Pat. No. 5,239,016 to Cochran et al. suggests overcoming this problem by specifying the preform storage conditions and specifically selecting the preform thickness and stretch ratio.

To illustrate these problems, FIG. 1 shows a typical bottle manufacturing process wherein in step 1, a preform is made, typically by injection molding or extrusion molding, and in step 2 the preform is blown into a bottle. If the bottle includes an oxidative catalyst for scavenging oxygen, then there may be a necessary aging process (step 3) which requires a certain time period $t_1$. This aging process may be undesirable in that it slows down the manufacturing cycle, and thus increases the cost. In addition, the prior art suggests that active steps must be taken to increase the rate of aging, such as a combination of temperature and humidity which further increase the cost of manufacture. Once properly aged, so that the oxidative catalyst is now activated, the containers may be further stored empty (step 4) for some time period $t_2$, prior to filling the container in step 5. This empty storage period may pose a problem in that storage in air may deplete the oxygen scavenging effect. This forces an extra burden on the manufacturer to closely monitor the period of empty storage and requires either immediate filling of the bottles upon activation or a resultant loss of the oxygen scavenging effect. After filling in step 5, the filled bottles may be stored with the manufacturer, retailer or user for a filled storage period $t_3$ in step 6, prior to use in step 7. It is desirable to have a long filled shelf life in which the container provides the necessary oxygen barrier properties to preserve the product contained therein. The filled shelf life is effected by the amount of oxygen which may enter the container during product filling, which oxygen should preferably be absorbed by the container and taken out of contact with the product. Thus, in the commercial world satisfying the various requirements of manufacture, storage and use involves a complex set of sometimes contradictory requirements.

U.S. Pat. No. 5,202,052 to Zenner teaches the use of an amino polycarboxcylic acid chelate or complex of a transition metal, or salt thereof, dispersed relatively uniformly throughout a polymer carrier, in an amount effective to act as an oxygen scavenger when activated by contact with water or water vapor which permeates the polymer. A preferred oxygen scavenging compound is ferrous ethylene diamine tetraacetic acid (EDTA), or salts thereof.

WO 90/00504 (Frandsen) describes a polymer composition containing a metal-catalyzed oxidizable organic polymer, preferably polyamides and copolyamides, both aromatic and aliphatic, and preferably MX nylons. The preferred metal catalysts are iron, cobalt and nickel. Frandsen describes the preparation of a masterbatch of the oxygen scavenging composition which may later be mixed with other polymers (e.g. 96% PET and 4% of the masterbatch). Frandsen alleges a reduction in oxygen permeability coefficient for containers produced from PET and a masterbatch composition based on nylon 6,6 at levels below 0.01–0.05, as compared to prior art containers having a permeability coefficient of 1–3.

Other references (e.g., U.S. Pat. Nos. 4,536,409 and 4,702,966) describe a multilayer structure in which the outer and inner layers are olefinic and resistant to the transmission of water vapor at room temperature, but at elevated temperatures permit water vapor to permeate and trigger (activate) the oxygen absorbing species.

Other efforts to control oxygen permeation involve the use of high oxygen barrier layers which do not scavenge oxygen, but merely retard the transmission of oxygen through the container wall. Of significant commercial success are the five-layer ketchup and hot-fill juice containers developed by Continental PET Technologies, Inc. of Merrimack, N.H. These multilayer structures incorporate inner, core and outer layers of PET, and intermediate layers of a high oxygen barrier material such as ethylene vinyl alcohol (EVOH). In a further development, not related to oxygen barrier properties, the U.S. Food and Drug Administration (FDA) recently approved the use of post consumer PET in the core layer of such packaging. This is particularly desirable in terms of the environmental benefits of promoting the use of recycled materials, and the cost savings of utilizing such recycled materials. However, these multilayer structures rely on preventing transmission of oxygen, rather than scavenging oxygen.

The variety of oxygen barrier systems disclosed in the art is strong evidence of the commercial need for such packaging, and also that the known systems do not solve all of the problems. Thus, there is an ongoing need for an oxygen scavenger and/or oxygen barrier package having a cost-effective manufacturing cycle and a long product shelf life.

SUMMARY OF THE INVENTION

There are multiple aspects of the present invention which can be used together or separately to enable the manufacture of packaging for oxygen sensitive products.

In one aspect, the invention provides an oxygen scavenging composition which incorporates the use of post consumer polyethylene terephthalate (PC-PET) in an amount effective to accelerate activation of the oxygen scavenger. The PC-PET may comprise at least on the order of 50%, and more specifically on the order of 90–100%, as a percentage of the total weight.

In a second aspect, preform and container multilayer structures are provided which include an oxygen-scavenging core layer with PC-PET, between inner and outer layers of one or more barrier polymers which retard the migration of the oxygen scavenger and its byproducts. The core layer scavenges oxygen from the interior of the filled package, and prevents exterior oxygen from reaching the contents of the package. The inner layer protects the food product from contact with the oxygen scavenger, its byproducts, and/or PC-PET contaminates.

In a third aspect, a method of making a preform is provided including preparing a masterbatch of PET and an oxygen scavenger, preparing a first blend of the masterbatch and a PET component including PC-PET, and then forming a preform having a core layer of the first blend and inner and outer layers of one or more barrier polymers which retard the migration of the oxygen scavenger and its byproducts. The masterbatch preparation takes place in a moisture and oxygen protected environment to prevent premature activation of the oxygen scavenger; similarly, the first blend preparation takes place in a controlled environment to prevent depletion of the oxygen scavenging effect (following activation). The masterbatch may comprise on the order of 50–90% PET, and 10–50% oxygen scavenger. The first blend may comprise on the order of 1–10% masterbatch and 90–99% polymer, which includes at least on the order of 50% PC-PET. In a particular embodiment, the masterbatch is on the order of 50% virgin PET, 50% polyamide, and 3000–6500 ppm metal catalyst; the first blend is on the order of 96–98% PC-PET, 2–4% masterbatch, and 250–500 ppm metal catalyst.

In a fourth aspect, preform and container multilayer structures are provided which include an oxygen scavenging core layer, and an inner layer permeable to some component which enables oxygen scavenging in the core layer. In one embodiment, the inner layer (disposed between the core layer and product in the filled container) includes a first polymer permeable to a first component of the filled product and which first polymer has a relatively high oxygen barrier condition in the absence of the first component, and a relatively low oxygen barrier condition in the presence of the first component. For example, the first polymer may be ethylene vinyl alcohol (EVOH) or MXD-6 nylon, through which water from the filled product will permeate and lower the oxygen barrier property of the EVOH or MXD-6 nylon, thereby enabling oxygen entrapped in the container during filling to permeate through to the core layer and be removed by the oxygen scavenger. In contrast, before the container is filled, the first polymer prevents transmission of oxygen to the core layer, thus preventing depletion of the oxygen scavenging effect. An outer layer of the same first polymer (or another high-oxygen barrier polymer) retards the ingress and egress of oxygen, in both the filled and unfilled containers. Thus, this packaging structure provides both the reduced oxygen transmission required during unfilled storage, and the increased oxygen transmission through the inner layer following product filling.

In a second embodiment, a first component of the inner and/or outer layer polymers permeates through to the core and accelerates activation of the oxygen scavenger.

These and other advantages of the present invention will be more particularly set forth with regard to the following detailed description and accompanying drawings.

BRIEF DESCRIPTION OF THE DRAWINGS

FIG. 8 is an elevational view of a five-layer ketchup container according to this invention;

FIG. 9 is an enlarged fragmentary sectional view taken through the sidewall of the container of FIG. 8, showing the five layers;

which enables transmission of oxygen through the inner layer to the oxygen scavenging core layer.

DETAILED DESCRIPTION
Preparation of Masterbatch

Figure 1:
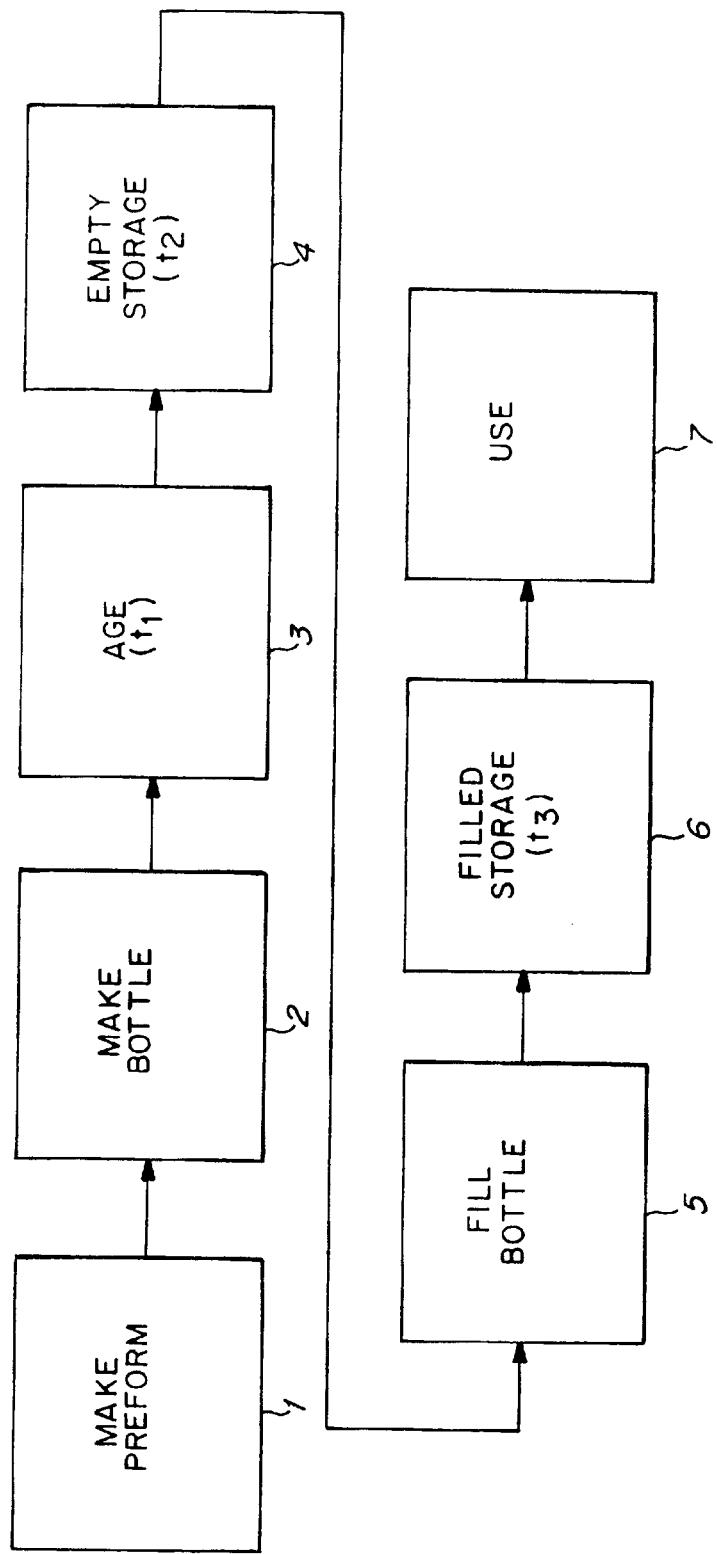
FIG. 1 is a block diagram illustrating the steps in a typical container manufacturing, storage and use cycle.
Figure 2:
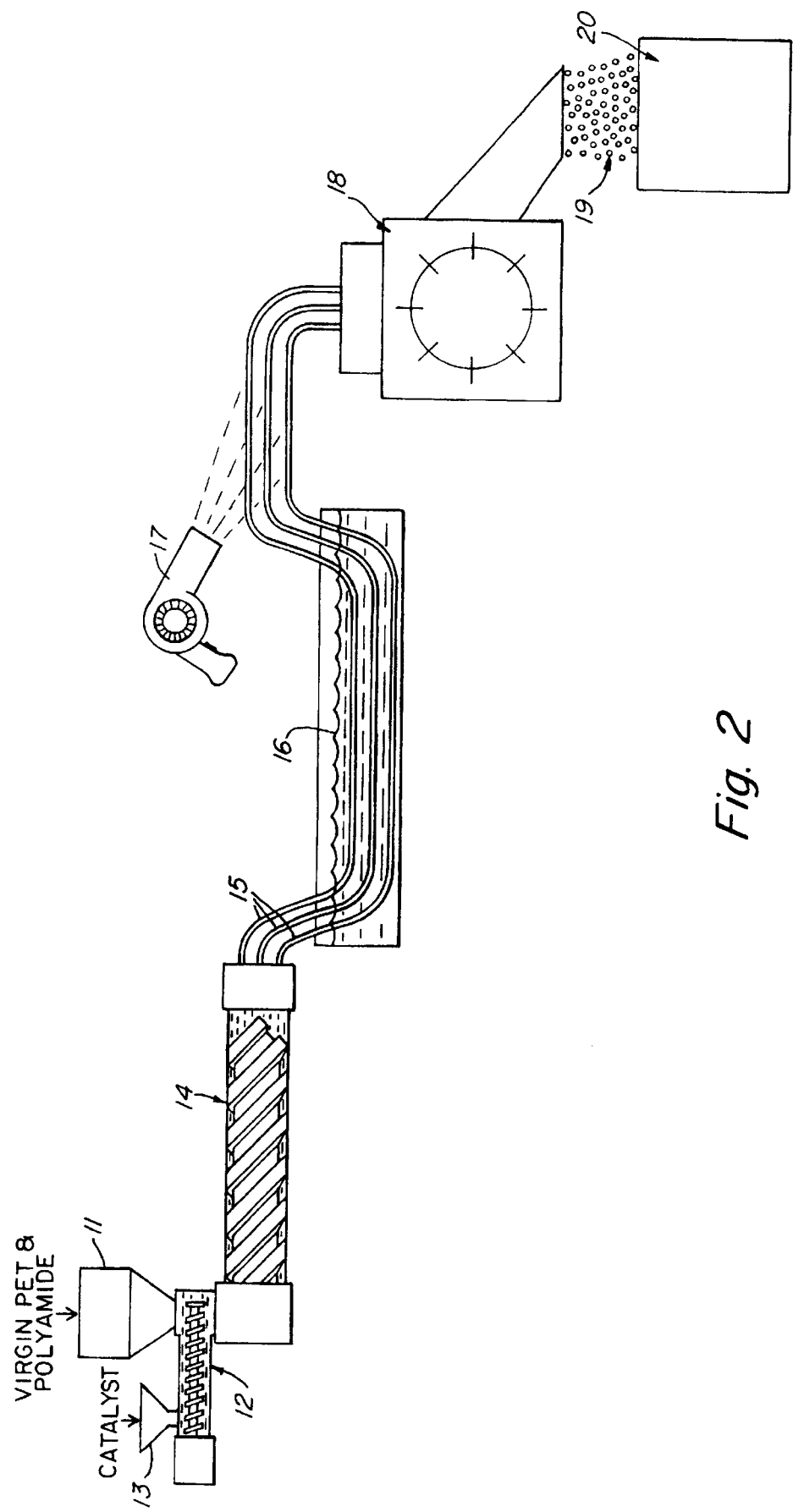
FIG. 2 is a schematic view illustrating production of a masterbatch incorporating PET and an oxygen scavenger according to the present invention.

Referring to FIG. 2, preparation of an oxygen scavenger masterbatch will first be described. In the particular embodiment described herein, a metal-catalyzed oxidizable organic polymer is used as the oxygen scavenger. Later embodiments describe the use of other types of oxygen scavengers.

FIG. 2 schematically illustrates the equipment and method for preparing masterbatch pellets. Virgin bottle grade PET and polyamide (e.g., MXD-6 nylon as the oxidizable organic polymer) are first preconditioned, for example, by drying six hours at 300°–300° F. in an air flow of 1–1.5 cubic feet per minute per lb per hour throughput, to attain a −40 or lower dew point. The dried PET and polyamide are then placed in a hopper 11 and feed into blending auger 12, along with a metal catalyst (e.g., cobolt) which is fed via sealed hopper 13 (to prevent reaction of the catalyst). The catalyst, virgin PET and polyamide are melted in a screw and barrel 14 which outputs strands 15 of the blend into water bath 16. The strands are cooled and solidified in water bath 16, exiting at the opposite end where blower 17 dries off the excess surface water. The strands then enter pellitizer 18 which outputs masterbatch pellets 19 for storage in container 20. The masterbatch pellets may have a moisture content above 2500 ppm.

Figure 3:
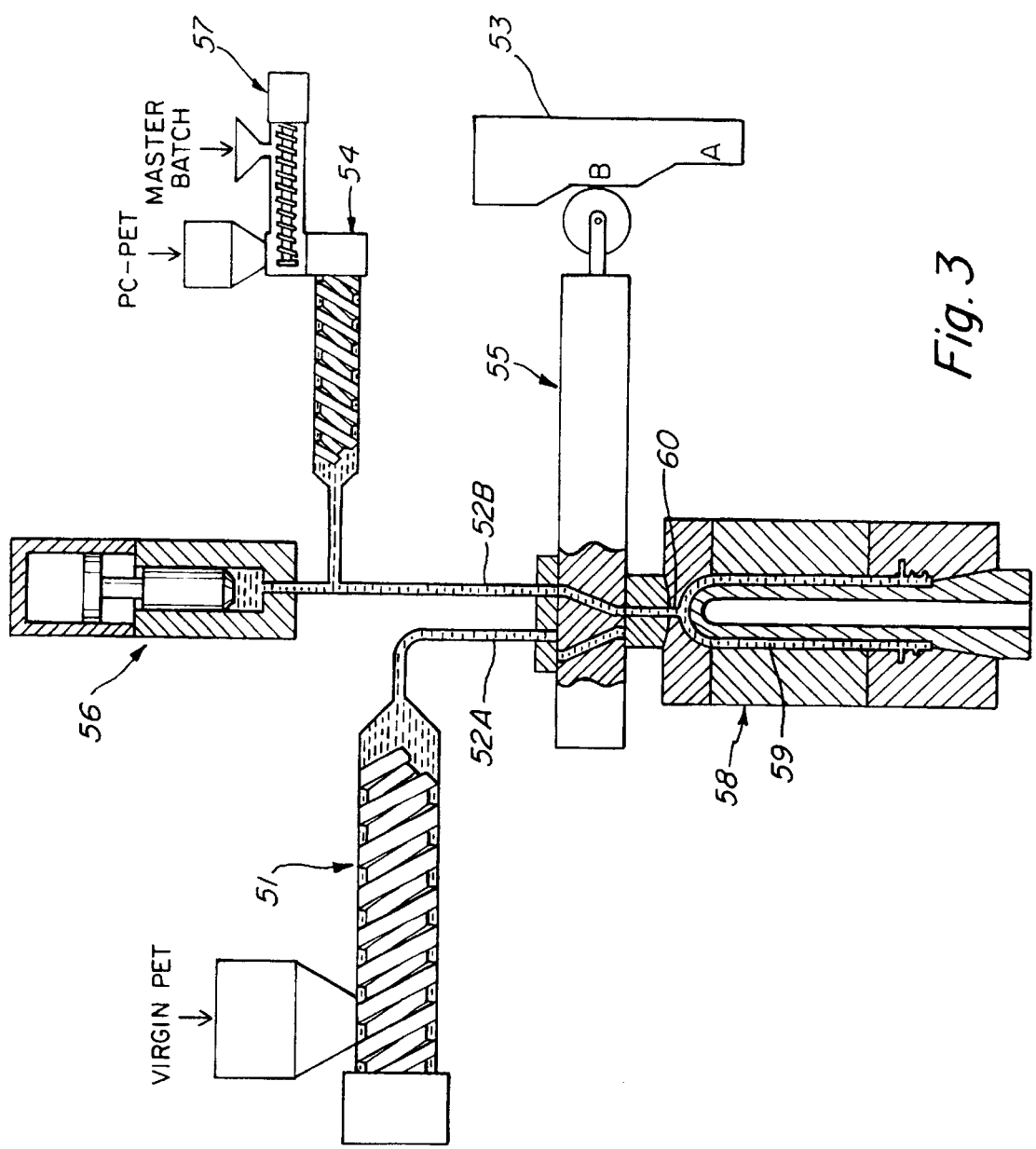
FIG. 3 is a schematic view of a single-cavity, two-material/three-shot injection molding system for making a five-layer preform according to the invention.

Referring to FIG. 3, the preforming stage will now be described wherein the masterbatch is combined with post consumer PET (PC-PET) to form a first blend for the preform core layer.

The preform apparatus consists of the following components to provide a sequential introduction of two melt streams in a metered fashion:

"A" extruder 51 melt channel from "A" extruder 52A melt channel from "B" extruder 52B valve cam 53

"B" extruder 54 melt valve 55 shot pot 56 blending auger 57 preform mold 58 preform 59 gate 60

The "A" extruder 51 is charged with virgin PET resin which has been dried to below 30 ppm using a Conair D-100 desiccant heater/dryer running at 300° F. for 6 hours at a dew point of −40° F. or lower with an air flow of at least 1.5 cubic feet per minute per lb per hour throughput.

The virgin PET resin is melted in a 40 mm screw and barrel with a 20 to 1 length-to-diameter (L/D) ratio and a compression ratio of 2.5 to 1. The barrel temperatures are 540°, 520°, 510° F. nozzle to throat. The melt is plasticized at 300 psi and 25 RPM.

The "B" extruder 54 is charged with PC-PET which has been dried down to 50–200 ppm, preferably 100–150 ppm, and masterbatch pellets fed by the blending auger 57 at the feed throat. The masterbatch contains virgin PET, polyamide, and catalyst, and is kept in an oxygen and moisture free environment while fed directly to the feed throat.

The blend is melted in a 25 mm screw and barrel with a 20 to 1 L/D ratio and a compression ratio of 2.5 to 1 and a general purpose flight configuration. The barrel temperatures are 520°, 520°, 520° F. The screw is of a non-reciprocating design and has no check ring.

The following process is exemplary for making a three-layer preform for an 82-gram, 64-ounce hot-fill bottle.

The process sequence starts once the previous cycle has been completed, the "A" extruder 51 is fully charged, and the shot pot 56 is fully charged with material from the "B" extruder 54. A Texas Instruments 510 programmable logic controller senses limit and proximity switches and activates several hydraulic solenoid valves. First, the "A" extruder 51 comes forward injecting virgin PET (for the inner and outer layers) until about 50% of the preform weight has been injected into the mold 58. The melt valve 55 extends fully to a position which provides clearance for the valve cam 53 to shift. The valve cam 53 then shifts to the "B" position and the melt valve 55 is retracted until it rests against the valve cam 53. In this position, the melt channel 52A for the "A" extruder 51 to the preform mold 58 is blocked, but the melt channel 52B for the shot pot 56 to the preform mold 58 is opened. The shot pot 56 extends pushing the blend melt (for the core layer) through the melt valve 55 filling the preform mold 58. When the shot pot 56 is empty, the melt valve 55 again extends fully for enough time that the valve cam 53 can shift back to the "A" position. The melt valve 55 then pulls back until it rests again on the valve cam 53. In this position, the melt channel 52B from the shot pot 56 to the preform mold is blocked, but the melt channel 52A from the "A" extruder 51 to the preform mold 58 is opened. The "A" extruder 51 again comes forward and packs the mold against shrinkage of the preform 59 and clears the post-consumer blend from the gate 60. After the preform has been adequately packed, the "A" extruder 51 plasticizes material for the next shot, and the "B" extruder 54 plasticizes the material from the main hopper and the blending auger 57 for the next shot, pushing it through the melt channel 52B and into the shot pot 56. The machine is now ready for the next cycle.

Figure 4:
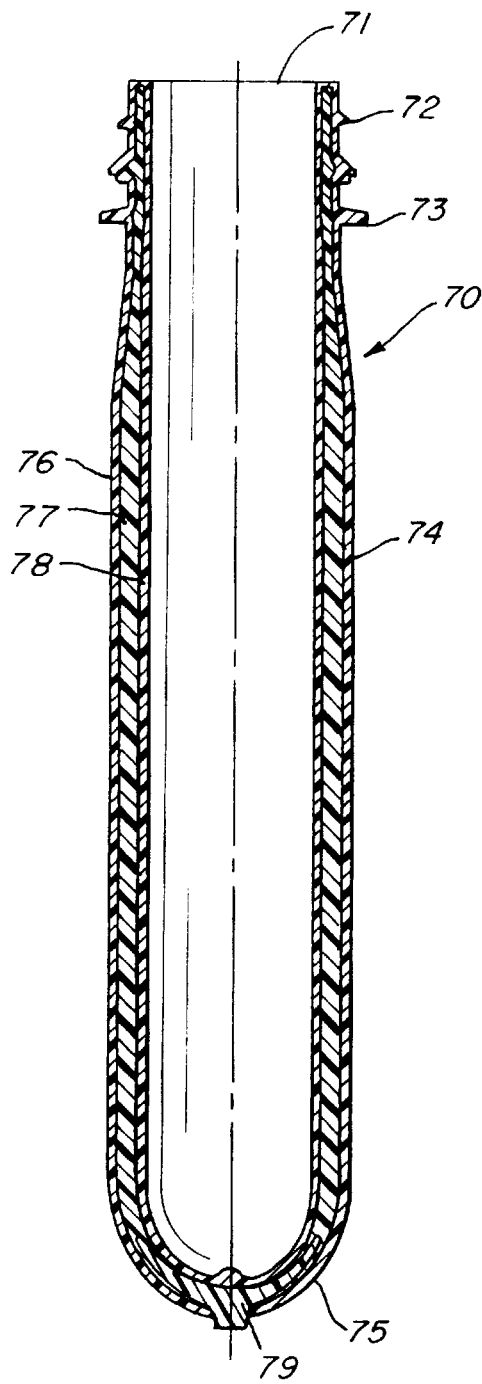
FIG. 4 is a cross-sectional view of a two-material/three-layer preform according to this invention.

A three-layer preform, made in accordance with the method of FIG. 3, may have the structure shown in FIG. 4. A resulting container may have the structure shown in FIGS. 6–7, as discussed hereinafter.

Activation of the Oxygen Scavenger

The processes used to maintain freshness of the oxygen scavenger will vary depending on the specific scavenger and the method of activation used. Activation of the oxygen scavenging effect usually requires some combination of the following: oxygen, nitrogen, volatile organic compounds (VOCs), water vapor, carbon dioxide, carbon, heat, or radiation. Prior to activation, the focus will mainly be on keeping the product from becoming activated. After activation, the focus is on filling the package while the package still retains a high percentage of its oxygen scavenging power.

Where catalysts are used, the catalyst is normally purchased in a high-barrier package which shields the catalyst from whatever combination of chemicals and energy are required to activate the catalyst. Once in the production process, the catalyst must be kept fresh until consumed and converted. Water-initiated catalysts require a dry and oxygen-free environment to inhibit premature activation and to prevent premature depletion of the oxygen scavenging capacity. A dry nitrogen blanket over the material in the hopper may suffice.

During production of the masterbatch, the masterbatch strands/pellets should be kept dry and away from oxygen as they are produced by the pelletizing line. Most pelletizing lines flow chilled water directly onto melting strands, prior to grinding them into pellets. Some water-initiated catalyst systems may require that a different cooling method, such as cool dry air or the use of chilled rolls or plates be used in the pelletizing lines, unless it is found that (once within the polymer matrix) both moisture and time are required for activation. If this is the case, it may be acceptable to use direct water cooling in the pelletizing process immediately followed by a drying/crystallizing step.

The finished masterbatch may require special handling, such as a combination of first-in first-out (FIFO) and just-in-time (JIT) manufacturing methods, and/or refrigeration to delay the activation.

As with the catalyst, the masterbatch will need to be kept fresh once it is introduced into the preforming process. A nitrogen blanket over the hopper may suffice.

The preforms when made have a shelf life which can be extended by some combination of refrigeration, desiccation, and/or heat-sealing within gas barrier bags. Again, use of FIFO or JIT methods may be useful.

Preforms may need to be kept fresh during the blow-molding process. A modified atmosphere may be used during the blow-molding process if necessary.

The unfilled bottles will have a definite shelf life to maintain effectiveness of the scavenging capacity. The shelf-life can be extended using a combination of: refrigeration, desiccation, storing in a modified atmosphere environment, and sealing in a high-barrier container, such as a bag or box.

Additional care is required for catalysts which activate at room temperature in an oxygenated environment, then for those which require some combination of specific chemicals, heat, radiated energy (e.g., X-rays), or time for activation.

Multilayer Preform and Container Structures

Figure 5:
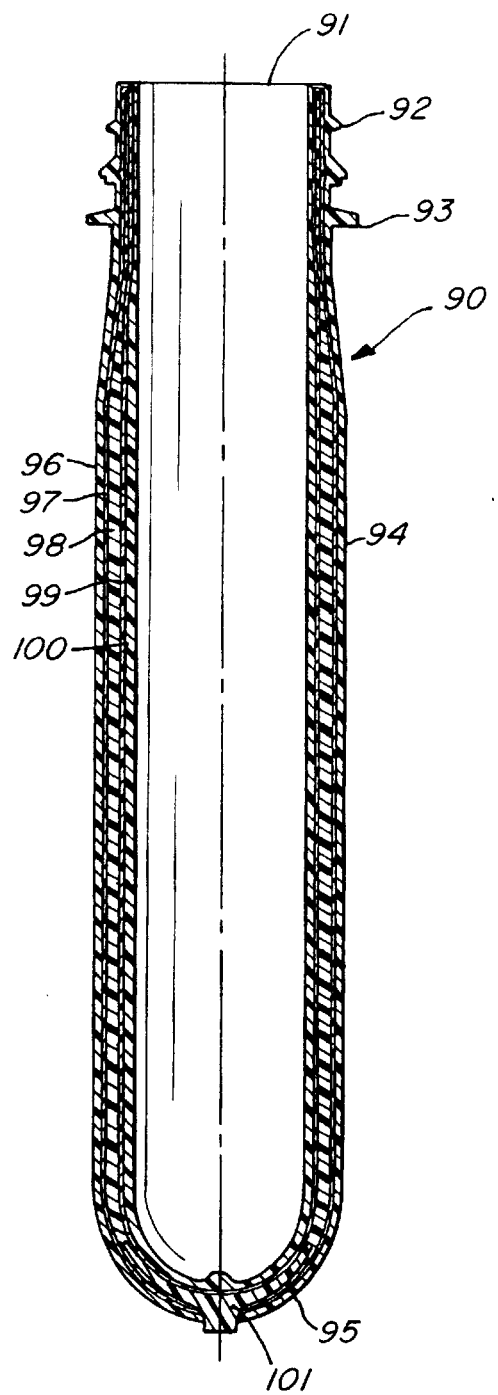
FIG. 5 is a cross-sectional view of a three-material/five-layer preform according to this invention.

FIGS. 4–5 show two alternative multi-layer preform structures, and FIGS. 6–9 show two alternative container structures, useful in the present invention.

FIG. 4 shows a substantially amorphous and transparent three-layer preform 70 having an open upper end 71 with a neck finish including outer threads 72 and a cylindrical flange 73. Below the neck flange there is a substantially cylindrical body portion 74, terminating in a closed hemispherical bottom end 75.

The three-layer sidewall construction includes outer layer 76, core layer 77, and inner layer 78. By way of example, the inner and outer (exterior) layers may be virgin bottle grade PET, while the core layer is the oxygen scavenging composition of this invention. In a lower base-forming portion of the preform, a five-layer structure may be formed by a last shot of virgin PET which clears the injection nozzle of the oxygen scavenging composition (so it is filled with virgin PET for preparation of the next preform). The last shot 79 of virgin PET forms a five-layer structure around the gate, and in this case the virgin PET extends through to the exterior of the preform at the gate region. The dimensions and wall thicknesses of the preform shown in FIG. 4 are not critical to the invention. Any number of different preform constructions may be used.

Figures 6, 7:
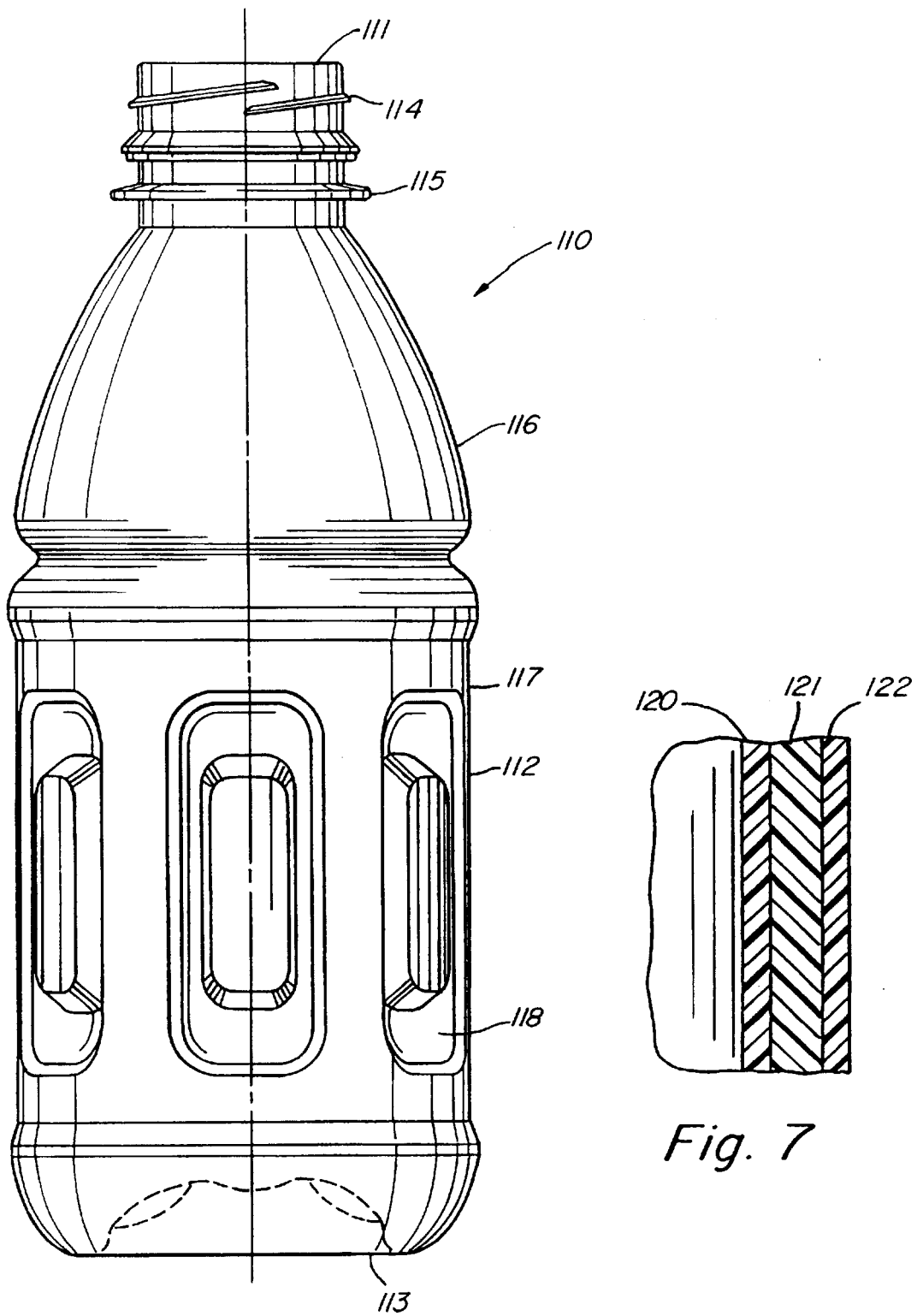
FIG. 6 is an elevational view of a three-layer hot-fill container according to this invention.
FIG. 7 is an enlarged fragmentary sectional view taken through the sidewall of the container of FIG. 6, showing the three-layers.

FIGS. 6–7 show a representative three-layer, hot-fill bottle which may be blow molded from a preform similar to that shown in FIG. 4. The hot-fill container 110 includes an open top end 111, substantially cylindrical sidewall 112, and closed bottom end 113. The container includes the same neck finish 114 and flange 115 of the preform, which are not expanded during blow molding. The sidewall includes an expanded shoulder portion 116 increasing in diameter to a cylinderical panel portion 117, which includes a plurality of vertically-elongated, symmetrically-disposed vacuum panels 118. The vacuum panels are designed to move inwardly to alleviate the vacuum formed during product cooling in the sealed container. Again, this container construction is by way of example only and the invention is not limited to any particular package structure.

FIG. 7 shows the three-layer sidewall construction including inner layer 120, core layer 121, and outer layer 122. The inner and outer layers may be virgin bottle grade PET, while the core layer 121 is made of the oxygen scavenging composition of this invention.

FIG. 5 shows an alternative five-layer preform 90. Again, the preform includes an open upper end 91, neck finish with threads 92 and flange 93, and body-forming portion 94 with a closed bottom end 95. The five-layer sidewall construction includes outer layer 96, first intermediate layer 97, core layer 98, second intermediate layer 99, and inner layer 100, disposed in serial order. By way of example, the inner and outer layers 96 and 100 may be virgin bottle grade PET, while the intermediate layers 97 and 99 are a high oxygen barrier material such as EVOH, and the core layer 98 is PC-PET with an oxygen scavenging composition. Again in the base, there may be a last shot of virgin PET 101 to clear the nozzle. The core layer scavenges oxygen from the interior of the filled package, and prevents exterior oxygen from reaching the contents of the package. The inner layer protects the food product from contact with the oxygen scavenger, its byproducts, or PC-PET contaminates.

FIGS. 8–9 show a representative ketchup container which may be blow molded from a five-layer preform similar to that of FIG. 5. Again, the details of the preform and container construction are not critical, and variations may be required to the preform construction in order to blow mold the container of FIG. 8. The ketchup container 130 includes an open top end 131, neck finish 132 with neck flange 133, a shoulder portion 134 increasing in diameter, and a panel portion 135 connecting to a base 136. The five-layer sidewall construction, as shown in FIG. 9, includes an inner layer 137, first intermediate layer 138, core layer 139, second intermediate layer 140, and outer layer 141. The inner and outer layers 137 and 141 may be virgin bottle grade PET, the core layer PC-PET with an oxygen scavenging composition, and the intermediate layers 138 and 140 a high oxygen barrier material such as EVOH.

Change in Oxygen Barrier Property Across the Wall

Figure 10:
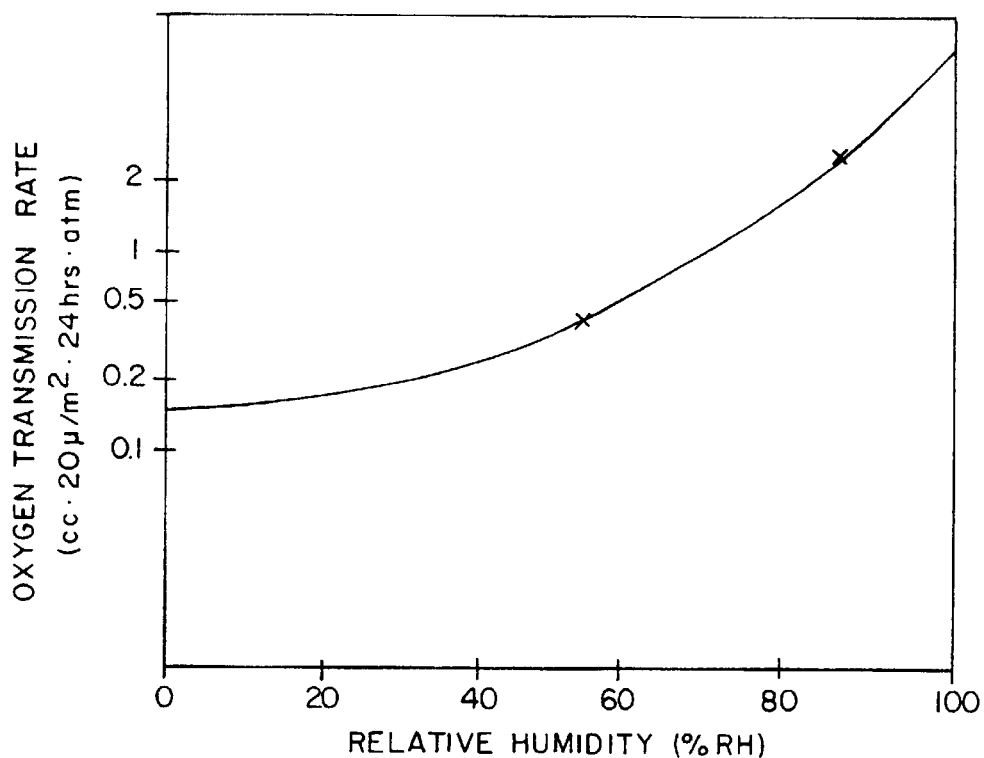
FIG. 10 is a graph illustrating the increase in oxygen transmission rate with increasing relative humidity for EVOH.
Figure 11:
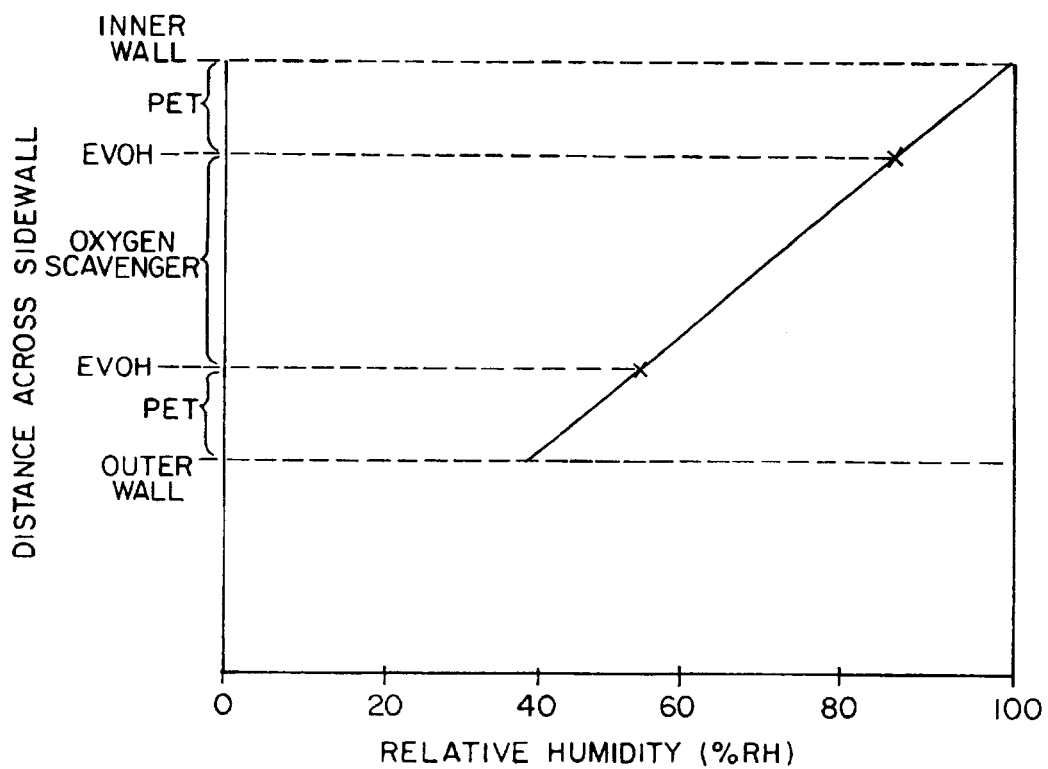
FIG. 11 is a graph illustrating the variation in relative humidity across the container sidewall (after product filing)

FIGS. 10–11 illustrate an additional aspect of the present invention, wherein a change in oxygen barrier condition across the wall can be induced by water from the product which is transmitted through the wall. In this example, we utilize the reduction in oxygen barrier property of EVOH with increasing relative humidity, which is illustrated in FIG. 10. More specifically, a five-layer sidewall is provided, similar to that shown in FIG. 9, comprising inner and outer layers of virgin PET, a central oxygen scavenger layer, and two intermediate layers of EVOH. The respective layers are designated on the vertical axis of FIG. 11. On the horizontal axis, the percent relative humidity is recorded. In an initial unfilled state, the five-layer container sidewall provides a high barrier to oxygen transmission based on the two intermediate EVOH layers, which essentially protect the central oxygen scavenging core layer from depletion prior to product filling. However, when the container is filled with a liquid product containing water, the water vapor permeates through the inner PET layer causing a drop in the relative oxygen barrier property of the inner layer. As shown in FIG. 11, water vapor transmission across the wall may produce, for example, an 85% relative humidity at the inner EVOH intermediate layer, and a 55% relative humidity at the outer EVOH layer. At 85% relative humidity, the inner EVOH layer would have a relatively low oxygen barrier condition (see FIG. 10) and thus allow oxygen entrapped in the container with the product to be transmitted across the inner PET and inner intermediate EVOH layers to reach the central oxygen scavenging layer, where the oxygen would be consumed. In contrast, oxygen would not be able to effectively pass the outer EVOH barrier layer, which is at a lower relative humidity.

Alternative Constructions

There are numerous multilayer preform and container constructions possible, each of which may be adapted for a particular product and/or manufacturing process. A few representative examples will be given.

A first five-layer structure may have relatively thin inner and outer intermediate layers of EVOH to provide the necessary high oxygen barrier properties without loss of clarity. Relatively thicker inner and outer layers of virgin PET would provide the necessary strength and clarity. A thick oxygen scavenger layer, of for example 50% of the wall thickness, and incorporating PC-PET, provides the necessary oxygen scavenging effect at a competitive price and with accelerated activation.

In an alternative five-layer structure, the two intermediate EVOH layers may be replaced by oxygen scavenging layers, and a non-scavaging core layer provided. For example, a PET/MXD-6/cobalt blend comprising 2–10% of the total preform weight, and more preferably 4–6% of the total preform weight, would provide highly concentrated intermediate oxidative layers to provide optimum barrier while maintaining clarity by the low blend layer thickness. Adhesion to inner, outer and core layers of PET would also be improved, compared to 100% MXD-6 or EVOH barrier layers. The center core layer may be virgin PET or post-consumer PET. Alternatively, the core layer may be an oxidative blend to further increase the shelf life, e.g., for beer. The inner and outer layers would remain virgin PET for FDA approved use with food and beverages.

A first three-layer sidewall construction may consist of an inner barrier layer providing a high oxygen barrier in one condition, and lower oxygen barrier in a second condition, a central core layer of an oxygen scavenging material, and an outer layer to provide strength to the wall structure. The inner layer may be EVOH, the barrier properties of which are reduced by moisture from the filled product. Alternatively, the change in oxygen barrier condition could be triggered by another ingredient in the product, for example, carbon dioxide or volatile organic compounds. Encapsulating the central oxygen scavenger layer eliminates any potential food contact problems. The core layer may be the PC-PET blend previously described to provide accelerated activation.

In an alternative three-layer construction, a central oxygen scavenging core layer is disposed between inner and outer layers, at least one of the inner and outer layers being permeable to and including a first component which accelerates activation of the oxygen scavenger. For example, the activating component may be water, carbon dioxide, volatile organic compounds, low-molecular weight oligomers, and trace impurities.

Another three-layer sidewall construction may comprise inner and outer layers of substantially virgin PET, and a core layer including PC-PET, a metal-catalyzed oxidizable organic polymer (e.g., 2% MXD-6 with 200 ppm metal catalyst), virgin PET, and on the order of 5–20% PEN by total weight of the core layer. The PEN provides enhanced thermal resistance in higher temperature applications.

Other oxygen scavenging materials may be used, such as: Oxygard (a polymer containing about 75% polyolefin and 25% reduced iron—see U.S. Pat. No. 5,153,038 to Koyama); any of the metal-catalyzed oxidative organic polymers described in U.S. Pat. Nos. 5,239,016 and 5,021,515 to Cochran et al., and WO 90/00504 to Frandsen et al.; or the amino polycarboxcylic acid chelate or complexes of a transition metal, or salt thereof described in U.S. Pat. No. 5,202,052 to Zenner et al.

Also included within the term "oxygen scavenger" and "oxygen scavenging composition" are "anti-oxidants," which have not previously been used at room temperature in a multi-layer structure to prevent oxygen transmission through a container wall. Examples include phosphite anti-oxidants, and phenolic anti-oxidants. More specifically, Ultranox 626 is a phosphite anti-oxidant sold by G.E. Specialty Chemicals, Parkersburg, W. Va. which is a bis(2, 4-di-t-butylphenyl)pentaerythritol diphosphite. The phosphite anti-oxidant may be used in combination with PC-PET in the core layer of a multilayer structure, where the inner and outer layers retard the migration of the oxygen scavenger and its byproducts.

There are a broad variety of metallic and organic compounds that are known to be effective in providing the oxygen catalyzing effect, and an appropriate compound may be selected based on cost and compatibility with the polymers. A preferred embodiment is a transition metal selected from the first, second and third transition series of the periodic table, such as iron, cobalt, nickel, ruthenium, rodium, palladium, osmium, iridium, and platinum. In another preferred embodiment, the metal compound comprises copper, manganese, or zinc. One skilled in the art can determine without much difficulty which concentration is appropriate in each blend, but in general it will be a range of 50–10,000 ppm by weight, and more preferably 50–1,000 ppm. The upper limit is dictated by factors such as economy, toxicity, clarity and color.

A list of alternative catalysts or base metals to be used in organic or inorganic chelates for use in this invention include: aluminum powder; aluminum carbide; aluminum chloride; cobalt powder; cobalt oxide; cobalt chloride; antimony powder; antimony oxide; antimony tri-acetate; antimony chloride III; antimony chloride V; amxpec DX1 pumpable; iron; electrolytic iron; iron oxide; platinum; platinum on alumina; palladium; palladium on alumina; ruthenium; rhodium; copper; copper oxide; carbon powder; diamond; and nickel.

Both aromatic and aliphatic polyamides can be used as the oxidizable organic polymer according to the invention. A preferred aromatic polyamide is a polymer formed by polymerizing metaxylylenediamine ($H_2NCH_2$—m—$C_6H_4$—$CH_2NH_2$) with adipic acid ($HO_2C(CH_2)_4CO_2H$), for example a product manufactured and sold by Mitsubishi Chemicals, Japan, under the designation MXD-6. A preferred polyamide of non-aromatic nature is nylon-6,6. Copolymers of polyamides and other polymers may be used. The proportion of polyamide in relation to PET can be varied mainly in view of the intended use of the container. A preferred range is 1–7% by weight polyamide and a more preferred range of 2–4% by weight polyamide.

The base polymer in the oxygen scavenger blend may be an aromatic condensation polymer including formable polyesters and polycarbonates. Phthalic acid polyesters based on terephthalic or isophthalic acid are commercially available and convenient. The hydroxy compounds are typically ethylene glycol and 1,4-di-(hydroxy methyl)cyclohexane. The intrinsic viscosity for phthalate polyesters are typically in the range of 0.6 to 1.2, and more particularly 0.7 to 1.0 (for O-chlorolphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Also useful is a commercially-available, relatively high copolymer content PET known as PETG (a cyclohexane dimethanol/PET copolymer) sold by Eastman Chemical.

Also useful as a base polymer or as a high-oxygen barrier layer is a packaging material with physical properties similar to PET, namely polyethylene naphthalate (PEN), but which also provides a 3–5× improvement in barrier property and enhanced thermal resistance, at some additional expense.

Polyolefins may also be used as the base polymer. Other options include acrylic/imide, amorphous nylon, and acrlonitrile styrene.

Oxygen barrier layers other than EVOH and PEN may include polyvinyl alcohol (PVOH), polyvinyldene chloride (PVDC), nylon 6, MXD-6, LCP (liquid crystal polymer), amorphous nylon, polyacrylonitrile (PAN) and styrene acrylonitrile (SAN).

The container of the present invention may be used to provide good oxygen barrier properties for products such as carbonated soft drinks. It is particularly useful in packaging products such as beer, because beer rapidly loses its flavor due to oxygen migration into the bottle. This is also true for products such as citrus products, tomato-based products, and aseptically-packaged meat.

Post Consumer PET (PC-PET)

Post consumer PET is prepared from PET plastic containers and other recycables that are returned by consumers for a recycling operation. For example, in 1990, 225 million PET plastic soft-drink bottles were recycled—more than 30% of those produced. Recycled PET is used to make polyester carpet, fiber-fill for clothing and sleeping bags, paint brush bristles, industrial strapping, non-food containers and over fifty other applications. Post consumer PET has now been approved by the FDA for use in certain food containers.

Post consumer PET is known to have a certain level of I.V. (intrinsic viscosity), moisture level, and contaminants. For example, typical post consumer PET (having a flake size of one-half inch maximum), has an I.V. average of about 0.66 dl/g, a moisture content of less than 0.25%, and the following levels of contaminants:

PVC: <100 ppm
aluminum: <50 ppm
olefin polymers (HDPE, LDPE, PP): <500 ppm
paper and labels: <250 ppm
colored PET: <2000 ppm
other contaminants: <500 ppm The basis for these contaminants may be better understood from the following general description of the PC-PET production process, which is given by way of example only.

Crushed bottles are delivered by flatbed truck to a processor plant, packaged in compressed and strapped bales measuring approximately 3'×4'×5' with a density of about 15 lbs per cubic foot and weighing about 750 lbs. Bales will typically contain about 90–95% green and clear PET bottles, 1–5% PVC bottles, 0–2% polyolefin bottles, and 0–3% other materials such as garbage bags, tin cans, aluminum cans, broken glass, newspapers, cardboard, wood, or other contaminant.

On average, 25% of PET bottles have base cups, but bale-to-bale this can vary from 0 to 100% depending on source. Polyethylene base cups make up about 25% of total bottle weight for bottles with base cups. The weight of the labels on PET bottles runs as high as 2% of package weight for paper labels, and as low as 0.5% for plastic labels. About 75% of PET bottles now use plastic labels made from polypropylene, polystyrene, or polyethylene. About 25% are paper labels.

The bales are individually loaded into an automatic bale breaker which directs the flattened bottles onto a conveyor. Some trash components fall out during this step of the process.

The first sortation step is always "positive" and can either be manual or automatic. The automatic method is preferred due to it's superior ability to remove PVC bottles without removing a large percentage of PET bottles. Manual systems will require some type of automated PVC detection.

In an automated positive sortation process, four separate material streams are produced: PVC, clear PET, green PET, and other. Over 99 percent of the PVC bottles are removed from both PET streams. Polyolefin bottle removal is over 90 percent efficient. The clear PET stream will still contain about 30% green PET bottles and the green stream will still contain about 30% clear bottles. Most of the "other" contaminants are removed at this stage due to the "positive" nature of the sort.

A secondary manual sort is then performed on just the two PET streams. An operator will typically stand between the two PET streams and finish the separation of the green from clear, clear from green, and removal of any other easily identifiable "other" contaminants.

Just before or after the secondary manual sort operator is an additional PVC detector. This mechanism does not sort the streams but merely shuts down the conveyors whenever a PCV bottle is sensed.

The clear PET stream is then directed to one to four stationary bed/rotary knife grinders with ⅛ to ½" screen size. Each grinder is automatically loaded by the conveyor and can process 1000 to 2000 lbs/hour.

The coarse ground flake converges from the grinders then enters an air separation, allutriation device usually consisting of a declined shaker screen table with high velocity air blowing the fluff from labels, paper or plastic, PET and other fines into a cyclone separator. Most of the labels are removed in this step.

The flake is then directed into the primary wash tank. This open top tank is made of unpainted mild or carbon steel and is of sufficient volume to contain a slurry of PET flake and water at a ratio of about 1 to 5 for an average residence time of 10 to 20 minutes at the designed system throughput. The continuous flake cleaning process consists of heavy agitation, 150° to 200° F. water temperature, 0.5 to 2% sodium or potassium hydroxide, 0.1 to 2% surfactant, and 0.1 to 1% of an anti-foaming agent.

The purpose of the caustic is to dissolve as much of the adhesives and contaminants as possible. The surfactant is used to reduce the surface tension of the solution, detactify the adhesives and contaminants from the flake, and to encapsulate any adhesives or contaminants which are not dissolved by the caustic so they will not re-adhere to the flake.

Care needs to be taken in the design and operation of the tank to assure that a high level of attrition scrubbing is performed. The impingement of flake against flake during agitation is the main source of flake cleaning. High chemical concentrations, high temperatures, high agitation forces, high slurry ratio, and minimal dead areas all contribute to adequate flake cleaning.

Multiple cleaning tanks can be used in parallel and/or series to provide the throughput or cleanliness required.

A shaker or spin type dryer is then used to obtain a coarse de-watering of the flake.

The first sink/float separation tank is then used to remove floatables such as flakes of polyethylene base cups or residual labels. The tank is filled with ambient temperature tap water. A small stream of water is introduced across the top to direct the floatables out one side of the tank. The PET, and non-floatable contaminants such as aluminum, are pulled from the bottom. This five-minute rinse step also helps remove the residual caustic, surfactant, and anti-foaming agent from the surface of the flake. No chemicals are added.

As with the primary wash tank, different combinations of rinse tanks can be arranged in parallel and/or series to provide the throughout and cleanliness needed.

The flake is then again dewatered using a shaker or spin type dryer, or, a simple screw auger can be used as the flake is pulled from the bottom of the sink/float tank. Pre-drying is then required to remove most of the surface water prior to the final stages of the process.

Flake then continues across a declined vibratory screen table to remove fines. This is used to improve the efficiency of the final automated separation equipment.

New to the market is a PVC flake detection and removal system. This will help remove any final traces of PVC, be it from PVC bottles or PVC cap liners.

Also newly available to the market is a non-clear flake detection and removal system. This system will help remove flakes of green PET, aluminum, steel, polyethylene, labels, or any other non-clear contaminant.

The final stages of cleaning include some combination of an electrostatic separator or an electronic sensor with air jet system. The electrostatic system is capable of reducing aluminum or steel contamination from 2000 ppm down to 200 ppm but requires at least two passes to reduce contamination levels down to 25 ppm. The electronic sensor with air jet system can easily get below the 25 ppm level if the incoming level is below 500 ppm and can produce flake approaching 0.0 ppm with multiple passes. A system with first an electrostatic separator followed by an electronic sensor with air jet probably does the best job of reducing the level of metal below 25 ppm under all conditions.

At the end of this process is final inspection and packaging. Packing in gaylords or super sacks is preferred for quality traceability over use of rail cars, bulk trucks, or storage in silos.

While there have been shown and described several embodiments of the present invention, it will be obvious to those skilled in the art that various changes and modifications may be made therein without departing from the scope of the invention as defined by the appending claims.

What is claimed is:

1. A preform for expansion into a hollow plastic container body, the preform having a multilayer body-forming portion including:
   a core layer of an oxygen scavenger and a first polymer including post consumer polyethylene terephthalate (PC-PET) in an amount effective to accelerate activation of the oxygen scavenger; and
   inner and outer layers of one or more barrier polymers which retard the migration of the oxygen scavenger and its byproducts.

2. The preform of claim 1, wherein the body-forming portion is substantially transparent.

3. The preform of claim 1, wherein the oxygen scavenger is selected from the group consisting of a metal-catalyzed oxidizable organic polymer and an anti-oxidant.

4. The preform of claim 1, wherein the inner and outer layers comprise substantially virgin polyethylene terephthalate (PET).

5. The preform of claim 1, wherein the inner and outer layers include intermediate layers of a high oxygen barrier material.

6. The preform of claim 5, wherein the high-oxygen barrier material is selected from the group consisting of ethylene vinyl alcohol (EVOH), polyvinyl alcohol (PVOH), polyvinyldene chloride (PVDC), polyethylene naphthalate (PEN), polyacrylonitrile (PAN), styrene acrylonitrile (SAN), and liquid crystal polymer (LCP).

7. The preform of claim 1, wherein the core layer includes at least on the order of 50% PC-PET as a percentage of the total weight of the core layer.

8. The preform of claim 7, wherein the core layer includes on the order of 90 to 100% PC-PET as a percentage of the total weight of the core layer.

9. The preform of claim 5, wherein the oxygen scavenger is a metal-catalyzed oxidizable organic polymer, and the first polymer further includes virgin PET, and on the order of 5-20% polyethylene naphthalate by total weight of the core layer (PEN), and wherein the inner and outer layers are substantially virgin PET.

10. A container having a hollow plastic multilayer container body including:
    a core layer of an oxygen scavenger and a first polymer including post consumer polyethylene terephthalate (PC-PET) in an amount effective to accelerate activation of the oxygen scavenger; and
    inner and outer layers of one or more barrier polymers which retard migration of the oxygen scavenger and its byproducts.

11. The container of claim 10, wherein the body is substantially transparent.

12. The container of claim 10, wherein the oxygen scavenger is selected from the group consisting of a metal-catalyzed oxidizable organic polymer and an anti-oxidant.

13. The container of claim 10, wherein the inner and outer layers comprise substantially virgin polyethylene terephthalate (PET).

14. The container of claim 10, wherein the inner and outer layers include intermediate layers of a high oxygen barrier material.

15. The container of claim 14, wherein the high-oxygen barrier material is selected from the group consisting of ethylene vinyl alcohol (EVOH), polyvinyl alcohol (PVOH), polyvinyldene chloride (PVDC), polyethylene naphthalate (PEN), polyacrylonitrile (PAN), styrene acrylonitrile (SAN), and liquid crystal polymer (LCP).

16. The container of claim 10, wherein the core layer includes at least on the order of 50% PC-PET as a percentage of the total weight of the core layer.

17. The container of claim 16, wherein the core layer includes on the order of 90 to 100% PC-PET as a percentage of the total weight of the core layer.

18. The container of claim 12, wherein the oxygen scavenger is a metal-catalyzed oxidizable organic polymer, and the first polymer further includes virgin PET, and on the order of 5-20% polyethylene naphthalate by total weight of the core layer (PEN), and wherein the inner and outer layers are substantially virgin PET.

19. A method of making a preform for expansion into a hollow plastic container body, the preform having a multilayer body-forming portion including a core layer surrounded by inner and outer layers, the method comprising the steps of:

preparing a masterbatch comprising on the order of 50–90% polyethylene terephthalate (PET) and on the order of 10–50% oxygen scavenger by total weight of the masterbatch, the oxygen scavenger being an oxidizable organic polymer and a metal catalyst and the masterbatch being prepared in a moisture and oxygen protected environment to prevent premature activation of the oxygen scavenger;

preparing a first blend including on the order of 1–10% masterbatch and on the order of 90–99% polyethylene terephthalate component by total weight of the core layer, the polyethylene terephthalate component including at least on the order of 50% post consumer PET (PC-PET), the first blend being prepared in a moisture and oxygen protected environment to prevent depletion of the oxygen scavenger; and forming a preform having a core layer of the first blend, and inner and outer layers of one or more barrier polymers which retard migration of the oxygen scavenger and its byproducts.

20. The method of claim 19, wherein the PC-PET has an intrinsic viscosity on the order of 0.58 to 0.77 and a moisture content on the order of 50–300 ppm.

21. The method of claim 19, wherein an additional high-oxygen barrier material is formed between the core layer and each of the inner and outer layers.

22. The method of claim 19, wherein the oxidizable organic polymer comprises a polyamide.

23. The method of claim 19, wherein the oxidizable organic polymer is selected from the group consisting of one or more of amorphous nylon, nylon-6, nylon-6,6, and MXD-6.

24. The method of claim 19, wherein the metal catalyst is selected from the group consisting of one or more of cobalt, palladium, platinum, antimony, rhodium, and copper.

25. The method of claim 19, wherein the PET in the masterbatch is selected from the group consisting of one or more of substantially virgin PET, PC-PET, and cyclohexane dimenthanol/PET copolymer.

26. The method of claim 19, wherein the masterbatch comprises on the order of 50% virgin PET and on the order of 50% polyamide based on the total weight of the masterbatch, and includes on the order of 3000–6500 ppm metal catalyst.

27. The method of claim 19, wherein the first blend comprises on the order of 96–98% PC-PET and 2–4% masterbatch by total weight of the first blend, and includes on the order of 250–500 ppm metal catalyst.

28. The method of claim 19, wherein the polyethylene terephthalate component of the first blend comprises on the order of 10–50% virgin PET.

29. A container having a hollow plastic multilayer body including:

a core layer including an oxygen scavenger;

inner and outer layers surrounding the core layer and made of one or more barrier polymers which retard the migration of the oxygen scavenger and it byproducts;

wherein the inner layer, disposed between the core layer and a product within the container body, is permeable to a first component of the product, and includes a first polymer having a relatively high oxygen barrier condition in the absence of the first component, and a relatively low oxygen barrier condition in the presence of the first component.

30. The container of claim 29, wherein the outer layer is made of an oxygen barrier material.

31. The container of claim 29, wherein the first component is selected from the group consisting of one or more of water, carbon dioxide, and volatile organic compounds.

32. The container of claim 29, wherein the first polymer is selected from the group consisting of ethylene vinyl alcohol (EVOH) and MXD-6 nylon.

33. The container of claim 29, wherein the inner and outer layers include intermediate layers between exterior layers and the core layer.

* * * * *